US009825942B2

(12) United States Patent
Bowman et al.

(10) Patent No.: US 9,825,942 B2
(45) Date of Patent: Nov. 21, 2017

(54) SYSTEM AND METHOD OF AUTHENTICATING A LIVE VIDEO STREAM

(71) Applicants: Eric Bowman, Mt Pleasant, SC (US); Brian Gilbert, Mt Pleasant, SC (US); Jeremy Martin, Mt Pleasant, SC (US)

(72) Inventors: Eric Bowman, Mt Pleasant, SC (US); Brian Gilbert, Mt Pleasant, SC (US); Jeremy Martin, Mt Pleasant, SC (US)

(73) Assignee: Infinite Takes, LLC, Mt. Pleasant, SC (US)

( * ) Notice: Subject to any disclaimer, the term of this patent is extended or adjusted under 35 U.S.C. 154(b) by 126 days.

(21) Appl. No.: 14/980,312

(22) Filed: Dec. 28, 2015

(65) Prior Publication Data

US 2016/0191493 A1    Jun. 30, 2016

Related U.S. Application Data

(60) Provisional application No. 62/097,382, filed on Dec. 29, 2014.

(51) Int. Cl.
*H04L 29/06* (2006.01)

(52) U.S. Cl.
CPC ............ *H04L 63/083* (2013.01); *H04L 63/08* (2013.01); *H04L 63/10* (2013.01); *H04L 65/00* (2013.01); *H04L 65/1069* (2013.01); *H04L 65/4076* (2013.01); *H04L 65/608* (2013.01); *H04L 69/16* (2013.01)

(58) Field of Classification Search
CPC .................................................. H04L 63/083
USPC ............................................................ 726/9
See application file for complete search history.

(56) References Cited

U.S. PATENT DOCUMENTS

| 8,640,229 B1* | 1/2014 | Riegel ................... H04L 9/3242 726/20 |
| 2011/0004929 A1 | 1/2011 | Hopkins et al. |
| 2011/0107379 A1 | 5/2011 | Lajoie et al. |
| 2012/0311320 A1 | 12/2012 | Brown et al. |

OTHER PUBLICATIONS

Parmar, H., Thornburgh, M., "Adobe's Real Time Messaging Protocol," Copyright Adobe Systems Incorporated, Dec. 21, 2012, 52pgs.
International Searching Authority, International Preliminary Report on Patentability for corresponding International Application No. PCT/US15/67622 dated Jul. 4, 2017, 8pgs.
International Searching Authority, International Search Report for corresponding International Application No. PCT/US15/67622 dated Mar. 17, 2016, 2pgs.

* cited by examiner

*Primary Examiner* — Longbit Chai
(74) *Attorney, Agent, or Firm* — Duane Morris LLP

(57) ABSTRACT

A method of authenticating a video streaming transmission comprising generating a secure token at an application server, providing the secure token to a user device, receiving the secure token at a media server with a publish request from the user device, transmitting the secure token to the application server for authentication, and authenticating the secure token. The publish request from the user device is enabled if the secure token is authenticated by the application server. The connection between the media server and the user device is terminated if the secure token fails to authenticate.

22 Claims, 7 Drawing Sheets

SYSTEM AND METHOD OF AUTHENTICATING A LIVE VIDEO STREAM

FIELD OF THE INVENTION

The present disclosure generally relates to video streaming. More specifically, the present disclosure relates to a one-to-all video streaming authentication protocol.

BACKGROUND

Recent trends in social media applications are moving to expand a user's ability to share content—including live video streaming—with a wide network of people. Users can rely on a wide range of increasingly sophisticated mobile and handheld devices to capture live video. Users are searching for a reliable means to instantaneously share the video they capture with their family, friends, wider social networks, or even the public in general.

Existing content-sharing applications or programs have had difficulty fully enabling the sharing of content or providing sufficient functionality to enable quick and easy sharing of content. One reason that full sharing has proven difficult is that video streaming is computationally expensive and requires careful management in a mobile-to-mobile context.

Video streaming applications also rely on underlying protocols which can be difficult to authenticate and present their own set of vulnerabilities. For example, the unsecured endpoints of a video stream can be easily exploited by malicious scripts to drive up server costs or to execute a denial of service attack

BRIEF DESCRIPTION OF THE DRAWINGS

The foregoing and other advantages of the present disclosure will become apparent upon reading the following detailed description and upon reference to the drawings.

Figure 1:
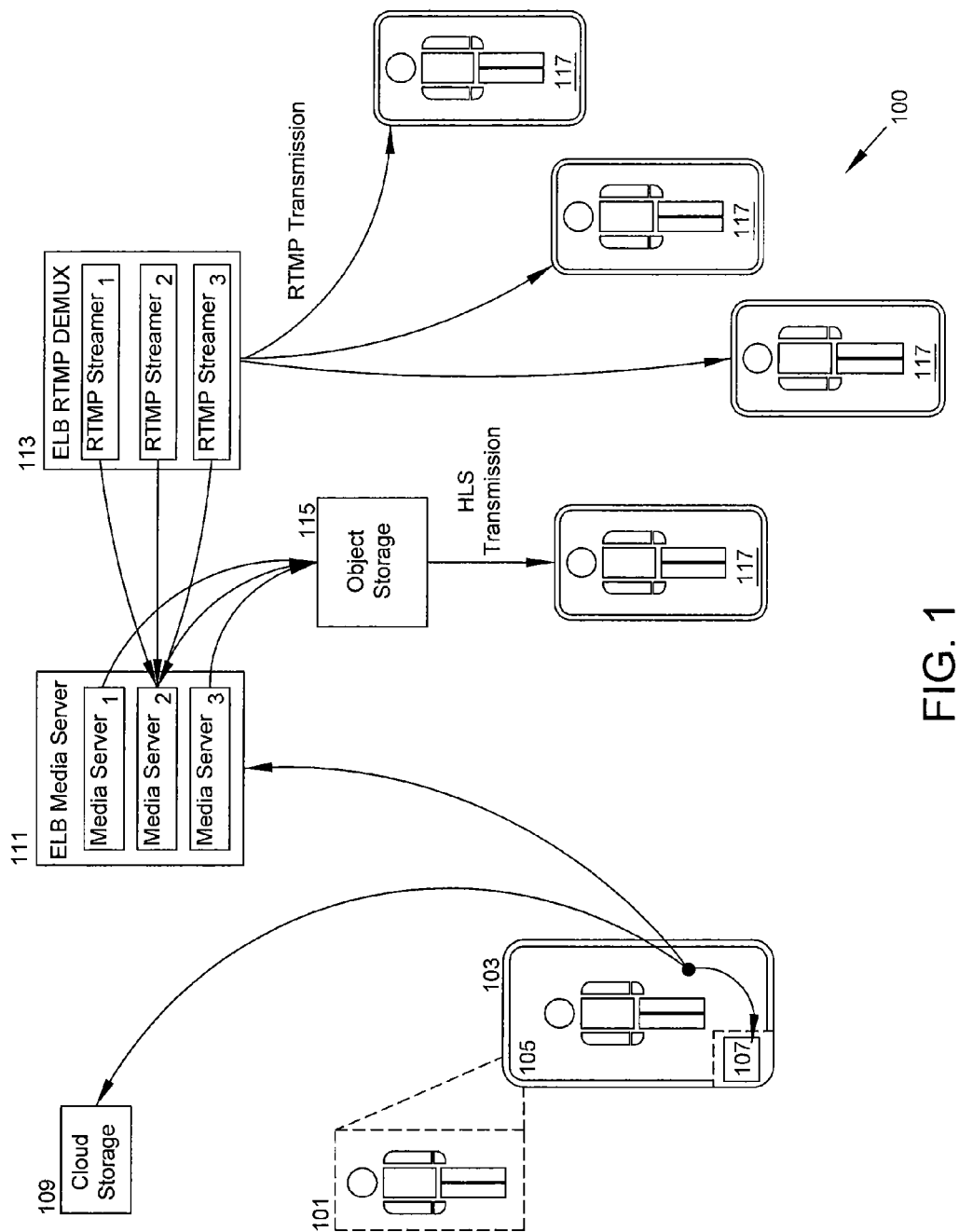
FIG. 1 is a schematic diagram of a live video streaming system in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

SUMMARY OF THE DISCLOSURE

The present disclosure is directed to a method of authenticating a live video stream transmission which obviates many of the deficiencies cited above. The present disclosure is generally directed to an authentication protocol to be used during initiation of one-to-all or one-to-many live video streaming transmissions. The present disclosure provides a method of authenticating a video streaming transmission comprising generating a secure token at an application server, providing the secure token to a user device, receiving the secure token at a media server with a publish command from the user device, transmitting the secure token to the application server for authentication, and authenticating the secure token. The publish command from the user device is enabled if the secure token is authenticated by the application server. The connection between the media server and the user device is terminated if the secure token fails to authenticate.

In some embodiments of the present disclosure, a method is provided for transmitting packetized video data to a media server, the method including the steps of: receiving, at an application server, a request from a user device to transmit packetized video data to a media server; transmitting an endpoint from the application server to the user device; establishing a TCP/IP connection between the user device and a media server; enabled the user device to transmit packetized video data to the media server; transmitting a secure token with the endpoint from the application server to the user device; transmitting, during the step of establishing a TCP/IP connection, the secure token from the user device to the media server; transmitting the secure token from the media server to the application server for authentication; authenticating by the application server the secure token before the step of enabling the user device to transmit packetized video data.

In some embodiments of the present disclosure, a method is provided for establishing a connection for the transmission of packetized video data, including the steps of: receiving at an application server an endpoint request from a user device; transmitting from the application server to the user device an endpoint and a secure token; receiving at a media server a publish command from the user device; and enabling the user device to transmit packetized video data to the media server; inserting the secure token into the playname field of the publish command of the user device; and authenticating, at the application server, the secure token prior to enabling the user device to transmit packetized video data.

DETAILED DESCRIPTION

The present disclosure provides systems and methods of authenticating live video streams such as the non-permanent sharing of live streamed video content. The present disclosure provides a system for the non-permanent sharing of live streamed video content which allows a user to simultaneously stream video content and save video content to an internal user device memory or a cloud system memory. Further, the present disclosure addresses vulnerabilities in existing live streaming protocols, such as unsecured endpoints, by providing a secure means of live streaming and authentication. The present disclosure may reasonably be applied to other fields and endeavors with equal success.

FIG. 1 is a schematic diagram of a live video streaming system 100 in accordance with some embodiments of the present disclosure. An image 101 is captured in video format by user device 103 (also called a client device 103 in protocol descriptions below) and displayed on screen 105 of the user device 103. In some embodiments, the user device 103 may be a smart phone, tablet, laptop, or similar mobile computing device.

As the video is captured by user device 103, it is transmitted from user device 103 to an elastic load balancing (ELB) media server 111, which comprises a plurality of media servers. These media servers are designated "media server 1" "media server 2" and "media server 3" in FIG. 1 but in some embodiments may include any number n of media servers. The video is transmitted from user device 103 to ELB media server 111 using a PUBLISH function of the Real Time Messaging Protocol (RTMP), discussed further in reference to FIGS. 2, 3, and 4 below. In some embodiments, the RTMP used to transmit video from user device 103 to ELB media server 111 has been modified in accordance with the description below and with reference to FIG. 3.

In some embodiments, the video captured by user device 103 is also transmitted to a cloud-based storage device 109 or other memory device remote from user device 103. In some embodiments, the video captured by user device 103 is stored on a memory device 107 internal to the user device 103.

ELB media server 111 receives packetized video segments from user device 103 and performs the necessary conversions to broadcast the video. Video content received at ELB media server 111 is distributed using HTTP Live Streaming (HLS) protocol or RTMP. For video distribution using HLS protocol, individual .ts file segments, including the .m3u8 envelope, are transmitted to and stored in object storage server 115. Video is then transmitted, or streamed, to a consumer user device 117.

For video distribution using RTMP, video is transferred to an ELB RTMP Demultiplexer 113 comprising a plurality of RTMP streamers. These RTMP streamers are designated "RTMP streamer 1" "RTMP streamer 2" and "RTMP streamer 3" in FIG. 1, but in some embodiments may include any number n of RTMP streamers. Each of the plurality of RTMP Streamers of the ELB RTMP Demultiplexer 113 is configured to use internal in-memory buffers to broadcast the video to a plurality of consumer user devices 117 using a single in-memory representation of the video stream. ELB RTMP Demultiplexer 113 is further configured to react to variable transfer bitrates of the video stream between ELB RTMP Demultiplexer 113 and each of the plurality of consumer user devices 117.

Thus as illustrated in FIG. 1 the live video streaming system 100 enables a one-to-many streaming of live video from a user device 103 to a plurality of consumer user devices 117. Live video streaming system 100 is configured to use a plurality of networks to distribute the stream of live video.

Figure 2A:
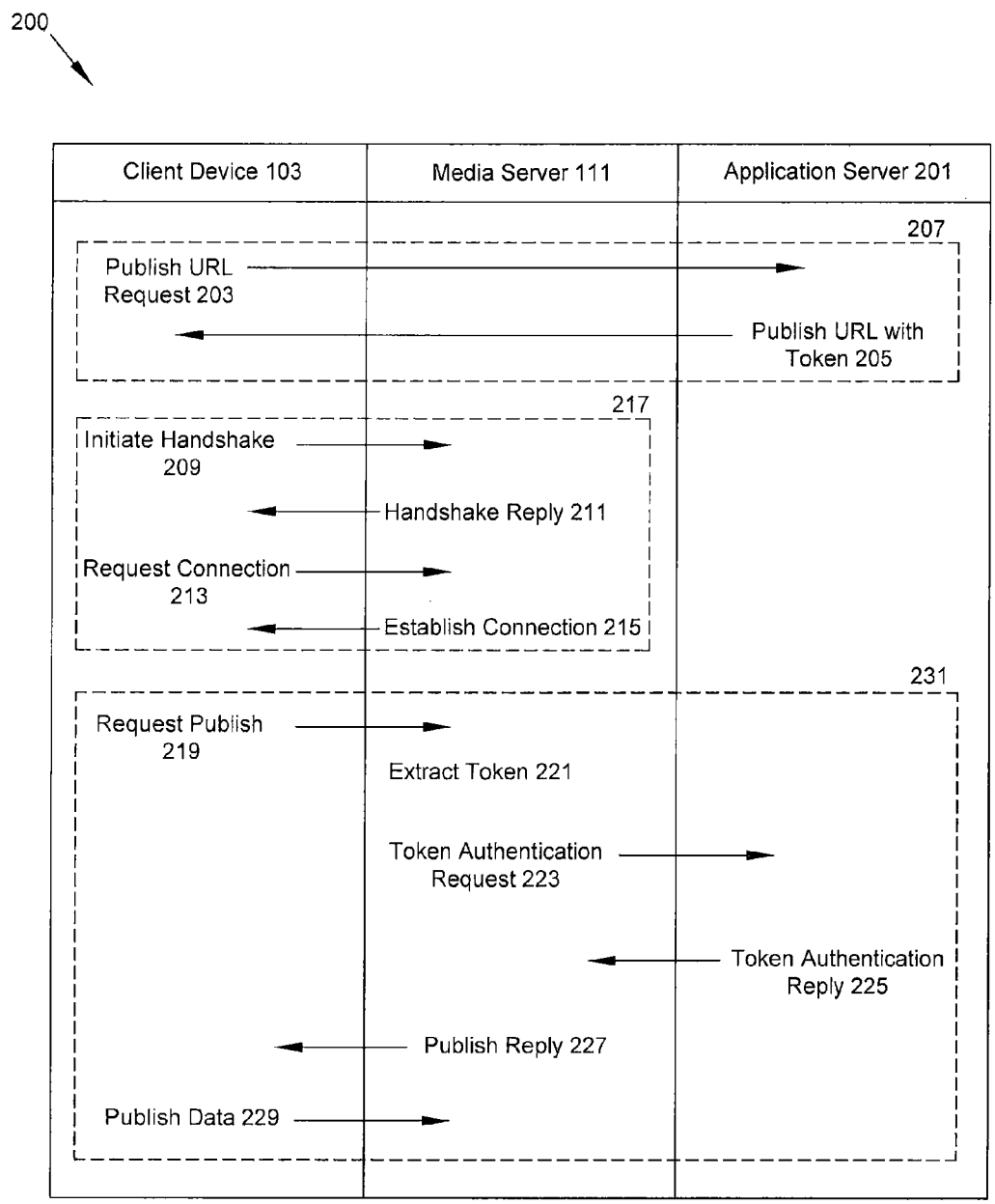
FIG. 2A is a flow diagram of a method of initiating a live stream transmission between the client device and media server in accordance with some embodiments of the present disclosure.

FIG. 2A is a flow diagram of a method 200 of initiating a live stream transmission between the client device 103 and media server 111. Method 200 is largely modeled on Real Time Messaging Protocol (RTMP). However, method 200 provides secured endpoints during live video stream transmission to address vulnerabilities associated with unsecured endpoints as discussed above. Authentication is provided in method 200 by an application server 201. In some embodiments, application server 201 is a third party server which is not controlled or operated by the same entity as the media server 111.

Method 200 begins with client device 103 transmitting a request at step 203 to the application server 201 for a Uniform Resource Locator (URL). Application server 201 responds at step 205 to the client device 103 by publishing a URL with an embedded security token. Collectively, steps 203 and 205 form the request and publish URL phase 207 of method 200.

In some embodiments, such as those involving the iOS operating system, the client device 103 request for a URL is sent to the application server 201 when the application is opened on the client device 103. This is known as "prefetch," because the client device 103 will receive the URL necessary to transmit a live video stream before such transmission is initiated by the user. In other embodiments, such as those using an android operating system, the client device 103 request for a URL is sent to the application server 201 when a user attempts to initiate live video stream transmission at the client device 103.

The security token embedded in the URL transmitted from application server 201 to client device 103 is a cryptographically-secure token. The security token may, for example, be generated using a pseudo-random number generator, an encryption algorithm such as a hash-based message authentication code secure hash algorithm (HMAC-SHA), another hash-based encryption algorithm, a non-hash-based encryption algorithm (e.g., a message authentication code algorithm), or any combination thereof. Application server 201 stores a copy of the security token for later authentication.

In some embodiments, application server 201 is a third party server provided by a third party authentication service. In some embodiments, the third party authentication service is enabled to perform dynamic decisionmaking when creating, transmitting, and authenticating a security token. The third party authentication service is thus not locked in to a single means of security token generation and evaluation.

In some embodiments, application server 201 and media server 111 are commonly operated. The common operator may be enabled to perform dynamic decisionmaking when creating, transmitting, and authenticating a security token, and is thus not locked in to a single means of security token generation and evaluation.

Following the request and publish URL phase 207, method 200 continues with the handshake and connection phase 217. This phase 217 comprises a handshake between client device 103 and media server 111, followed by the establishment of a connection between client device 103 and media server 111. The handshake and connection phase 217 is illustrated in general terms in FIG. 2A, and is shown in greater detail in FIG. 2B, described below.

At step 209, client device 103 initiates the RTMP handshake protocol. Media server 111 replies to the handshake initiation at step 211, again in accordance with the RTMP handshake protocol. Once the handshake is completed, the client device 103 requests a connection at step 213 and the media server 111 establishes the connection at step 215.

Figure 2B:
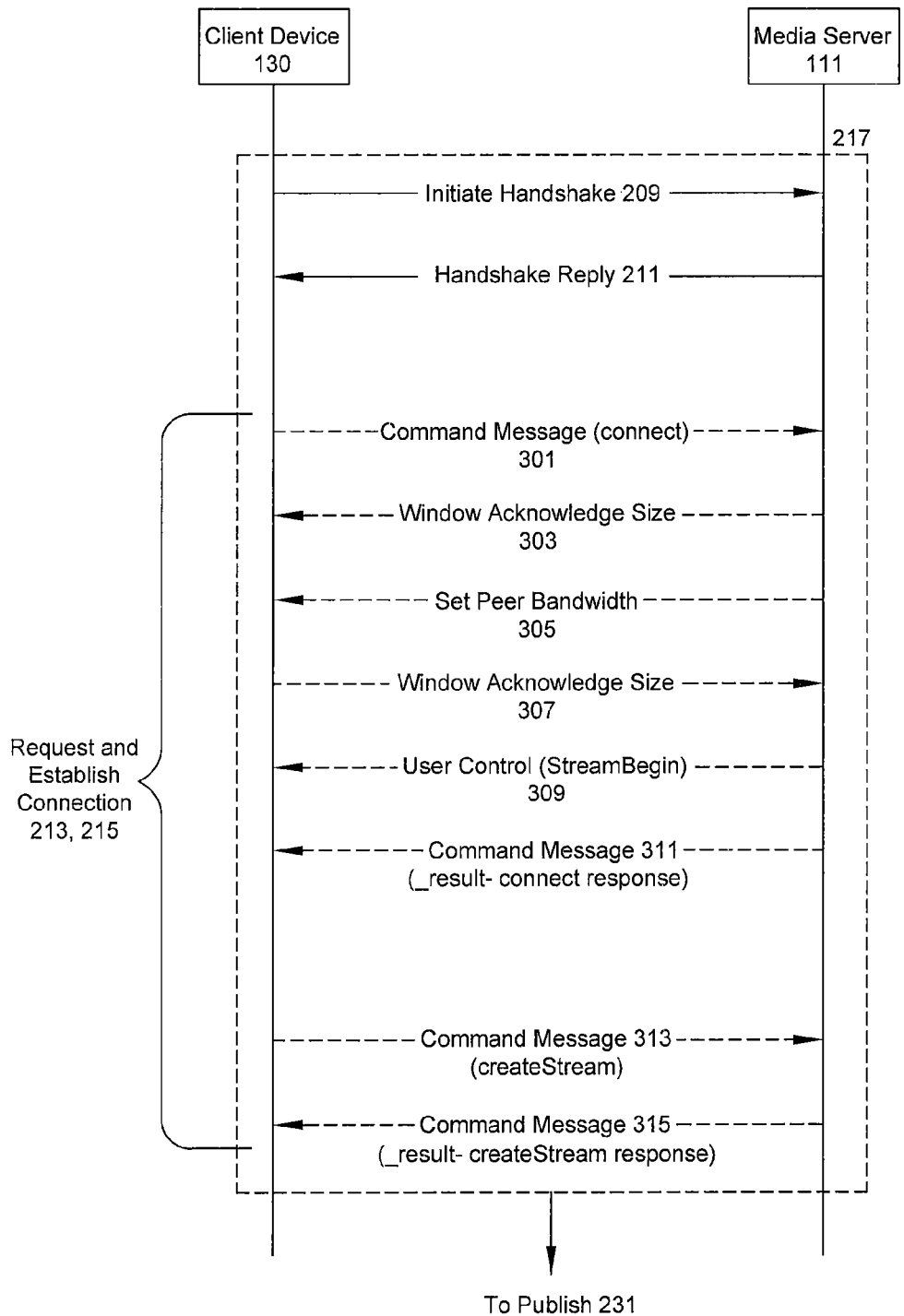
FIG. 2B is a flow diagram of a handshake and connection phase of a method of initiating a live stream transmission between the client device and media server in accordance with some embodiments of the present disclosure.

FIG. 2B illustrates the handshake and connection phase 217 in greater detail. Specifically, handshake and connection phase 217 begins with client device 103 initiating a handshake with media server 111 at step 209. Media server 111 replies to the handshake at step 211. RTMP is followed to establish a connection between client device 103 and media server 111. Client device 103 sends a command message to connect to the media server 111 at step 301. At steps 303 and 305, the media server responds with a window acknowledge size message to inform the client device 103 of the window size to use between sending acknowledgments, and with a set peer bandwidth message which limits the output bandwidth of client device 103. Upon receipt of the set peer bandwidth message, the client device limits its output bandwidth by limiting the amount of sent but unacknowledged data to the indicated window size.

At step 307 the client device 103 returns a window acknowledge size message to media server 111. At step 309, the media server 111 notifies the client device 103 of a user control event, the initiation of streaming which is controlled by the user of client device 103. At step 311 the media server 111 notifies client device 103 of the result of previous command message at step 301, which is the creation of a connection between media server 111 and client device 103.

At step 313 the client device 103 sends a command message to create a stream, and at step 315 the media server 111 responds with a stream creation. Once the handshake and connection phase 217 is completed, method 200 continues to the publish phase 231.

Returning to FIG. 2A, the publish phase 231 begins at step 219 with client device 103 sending a publish request to media server 111. This publish request includes the security token received from application server 201. At step 221, the media server extracts the security token and then at step 223 the security token is sent to the application server as part of a security token authentication request. The application server attempts to authenticate the security token at step 225.

In some embodiments, authenticating the security token comprises comparing the security token received from the media server at step 223 to the security token which was embedded in the URL transmitted to the client device 103 at step 205. As noted above, the security token transmitted to the client device 103 is generated using a variety of methods and is stored by the application server 201 for later authentication purposes.

If the security token received from the media server 111 at step 223 is authenticated, then a message to that effect is sent to media server 111. In some embodiments, the security token received from the media server at step 223 is authenticated if it matches the security token which was embedded in the URL transmitted to the client device 103 at step 205. In other embodiments, application server 201 replicates the token-generation process to authenticate the security token received from the media server at step 223. In still further embodiments various cryptographic techniques are used to authenticate the security token received from the media server at step 223.

With an authenticated security token media server 111 will proceed with the publish phase 231. However, if the security token received from the media server at step 223 does not match the security token which was embedded in the URL transmitted to the client device 103 at step 205, then the security token has failed authentication and a message to that effect is sent to media server 111. With an unauthenticated security token media server 111 will not proceed with the publish phase 231 and will instead break the previously established connection with client device 103.

In some embodiments, authenticating the security token comprises comparing the security token received at step 223 with the security token transmitted at step 205 as well as an evaluation of external factors (i.e. factors not directly associated with the security token itself). Such factors may include the IP address of the client device 103, the physical location of the client device 103, and the streaming rate of client device 103. In embodiments where external factors are considered during authentication, the application server 201 may be enabled to perform dynamic decisionmaking allowing the application server 201 to adjust authentication factors and parameters without manual intervention and server updates.

Based on the outcome of security token authentication at application server 201, media server 111 at step 227 sends a publish reply to client device 103. The publish reply either enables further steps in the publication phase if the security token was authenticated or severs the connection if the security token failed authentication. Once the publish reply is received, the client device 103 will begin to publish data at step 229.

Figure 2C:
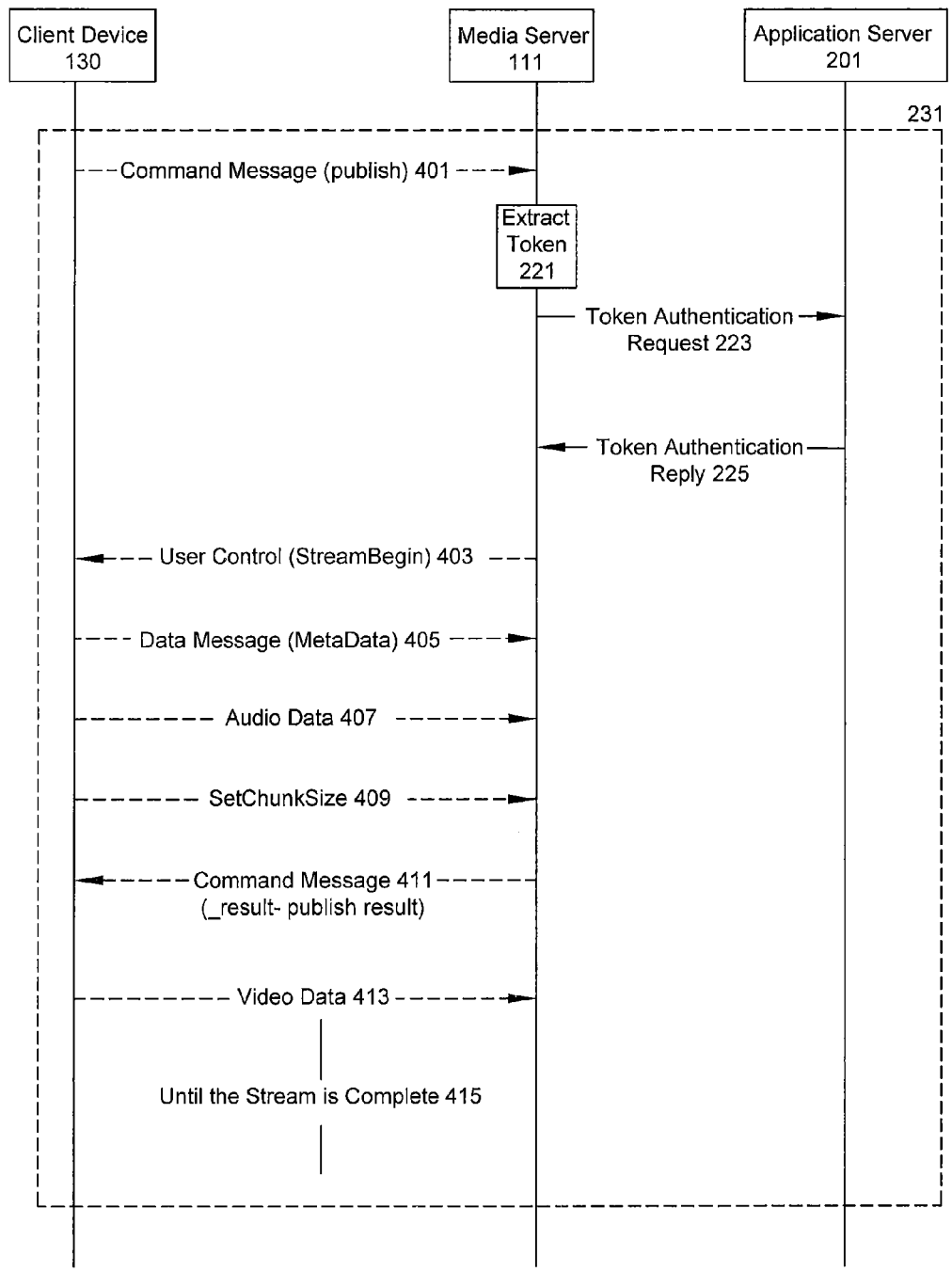
FIG. 2C is a flow diagram of a publish phase of a method of initiating a live stream transmission between the client device and media server in accordance with some embodiments of the present disclosure.

Publish phase 231 is illustrated in greater detail in FIG. 2C. In FIG. 2C the publish request sent from the client device 103 to the media server 111 at step 219 is illustrated as a publish command message at step 401. In some embodiments, the secure token is transmitted from the client device 103 to the media server 111 in the "playname" field of the publish command message at step 401.

Following the authentication reply from application server 201 to media server 111 at step 225, the media server 111 notifies client device 103 of a user controlled event, the initiation of streaming (StreamBegin) at step 403. Upon initiation of streaming, the client device 103 sends three successive messages to the media server 111 at steps 405, 407, and 409 to provide the media server 111 with metadata, audio data, and set chunk size, respectively. Media server 111 responds with a result command message at step 411. At step 413, client device 103 begins to transmit video data as packetized data such as packetized live video steaming to the media server 111, and this transmission of video data continues until the user ceases transmission.

Figure 3A:
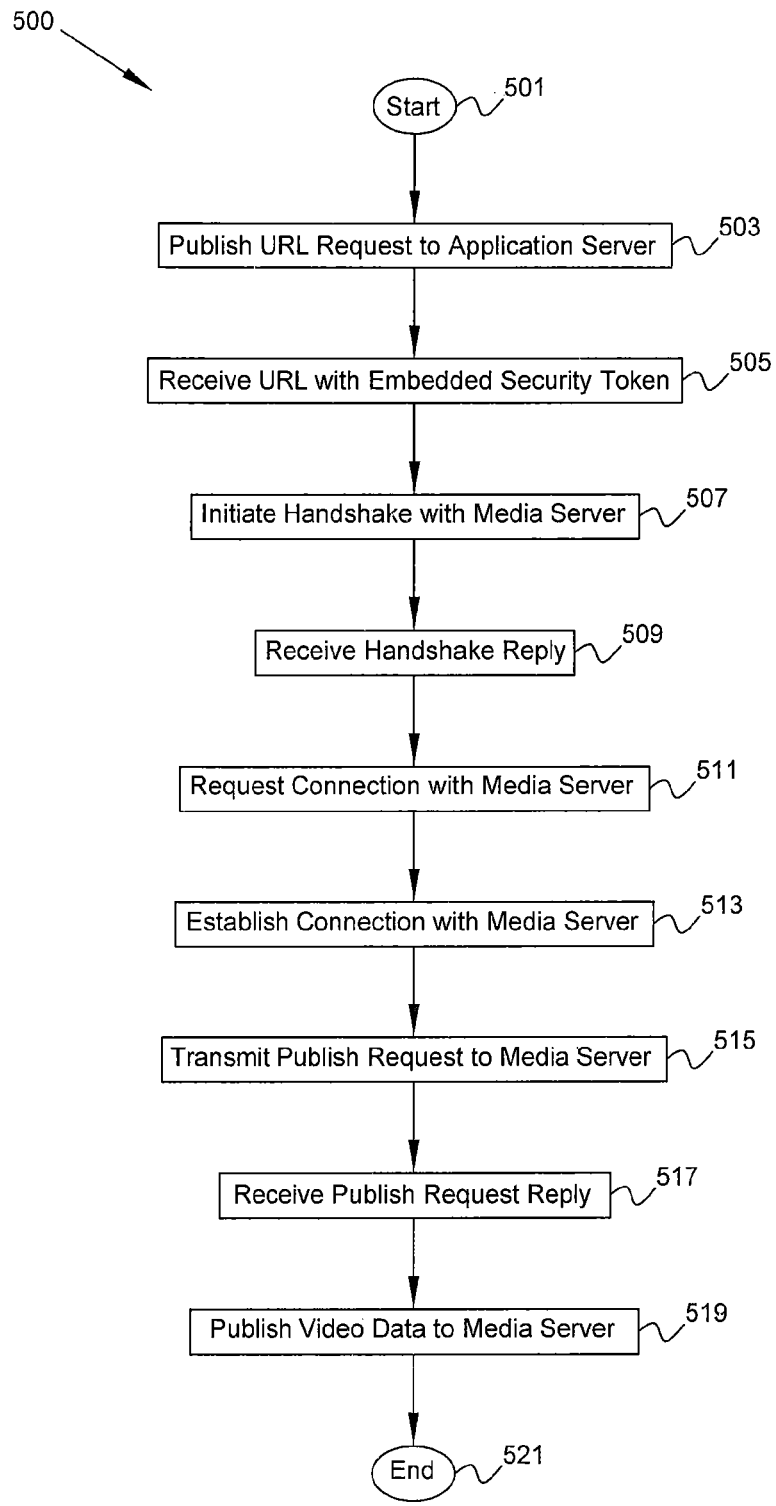
FIG. 3A is a flow diagram of a method of initiating a video stream transmission from a client device in accordance with some embodiments of the present disclosure.

FIG. 3A is a flow diagram of a method 500 of initiating a video stream transmission from a client device 103. The method 500 begins at step 501. At step 503 the client device publishes a URL request to the application server 201, and the application server 201 responds at step 505 with a URL embedded with a security token. Client device 103 then initiates a handshake with media server 111 at step 507, and the media server 111 replies to the handshake at step 509. Client device 103 requests a TCP/IP connection with media server 111 at step 511. At step 513 the connection is established. Upon user initiation, the client device 103 at step 515 transmits a publish request to media server 111. The publish request includes the security token. In some embodiments, the publish request is a RTMP publish command and the security token is embedded in the "playname" field of the command message. At step 517 the client device 103 receives a reply from the media server 111 to the publish request. The reply either enables the client device 103 for publishing or denies the request and severs the connection with the client device 103. If enabled, at step 519 the client device 103 publishes video data to media server 111. The method 500 ends at step 521 when the user ceases publishing video data or the connection is interrupted or severed.

Figure 3B:
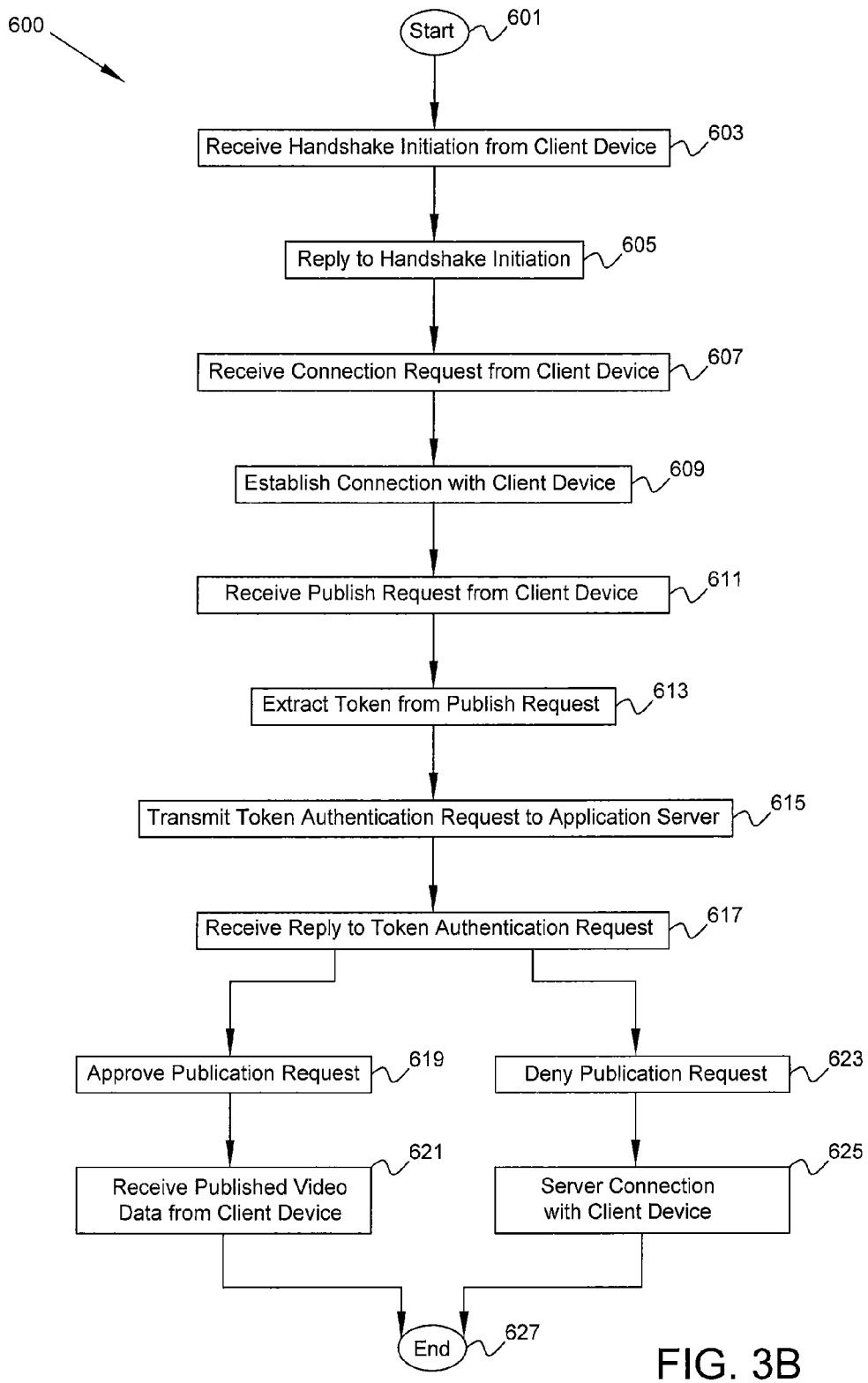
FIG. 3B is a flow diagram of a method of receiving a video stream transmission at a media server in accordance with some embodiments of the present disclosure.

FIG. 3B is a flow diagram of a method 600 of receiving a video stream transmission at a media server 111. Method 600 begins at step 601. At step 603, the media server 111 receives a handshake initiation from client device 103, and at step 605 the media server 111 replies to the handshake initiation. The media server 111 then receives a connection request from the client device at step 607. The media server 111 establishes the connection at step 609, and subsequently receives a publish request from the client device at step 611. The publish request includes a security token. In some embodiments, the publish request is a RTMP publish command and the security token is embedded in the "playname" field of the command message. At step 613 the security token is extracted from the publish request, and at step 615 the security token is transmitted to the application server 201 for authentication. A reply to the authentication request is received from the application server 201 at step 617, and this reply either authenticates the security token or fails to authenticate the security token. If the security token is authenticated by the application server 201, then media server 111 proceeds to step 619 and enables the client device 103 publish request. Once enabled, at step 621 the media server 111 receives published video data from the client device. If the security token is not authenticated by the application server 201, then media server 111 proceeds to step 623 and denies the publish request of client device 103. In some embodiments, media server then proceeds to step 625 and severs the TCP/IP connection with the client device 103. Method 600 ends at step 627.

Figure 3C:
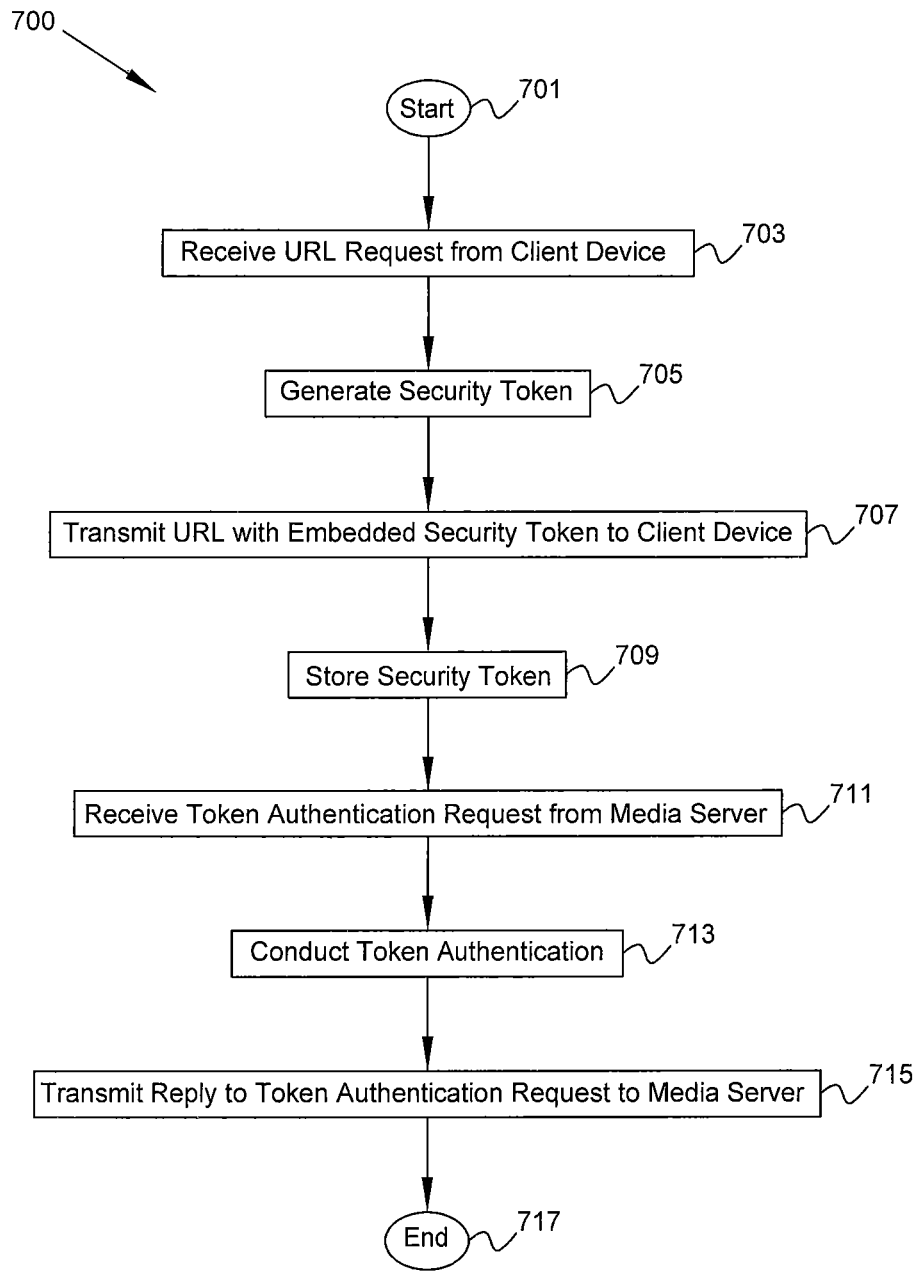
FIG. 3C is a flow diagram of a method of facilitating a video stream transmission at an application server in accordance with some embodiments of the present disclosure.

FIG. 3C is a flow diagram of a method 700 of facilitating a video stream transmission at an application server 201. Method 700 begins at step 701. At step 703, the application server 201 receives a URL publish request from client device 103. The application server responds by generating a security token at block 705, embedding the security token in the URL and transmitting the URL with embedded security token to the client device 103 at step 707, and storing the security token at step 709. At step 711 the security token is received from media server 111 with an authentication request. At step 713 the application server 201 conducts authentication of the security token. In some embodiments, authenticating the security token comprises comparing the security token received from the media server at step 711 to the security token which was embedded in the URL transmitted to the client device 103 at step 707. In some embodiments, authenticating the security token may additionally comprise evaluating various external factors and employing dynamic decisionmaking. At step 715, application server 201 replies to the security token authentication request from media server 111, either authenticating the security token or failing to authenticate the security token. Method 700 ends at step 717.

The present disclosure provides numerous advantages over the prior art. Most notably, the present disclosure provides a system and method of streaming live video content from a mobile user device to a plurality of consumer user devices using multiple networks, variable bit transfer rates, protocols, and formats. The present disclosure further provides a method of authenticating live video streams to enhance security of the disclosed system. The present disclosure further provides a novel means of identifying available video streams for viewing based on location and/or proximity of users.

Perhaps most significantly, the present disclosure provides a method of authenticating a client device generated live video stream transmission which is able to employ dynamic decisionmaking during the authentication process. The authentication may be performed by a third party authentication service, which generates, transmits to the client device, and later authenticates a security token. The authenticating party may additionally use external variables to evaluate the security token for authentication. Thus the authentication of the security token is easily altered and not locked in to a prescribed method. This dynamic authentication allows for updates and changes as necessary to adapt to evolving threats such as malicious scripts or denial of service attacks.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What we claim is:

1. A method of transmitting packetized video data to a media server comprising:
    receiving, at an application server, a request from a user device to transmit the packetized video data to a media server;
    transmitting an endpoint and a secure token from the application server to the user device in response to the request;
    establishing a TCP/IP connection between the user device and a media server, and transmitting the secure token with a publish request from the user device to the media server when the connection is established;
    transmitting the secure token from the media server to the application server for authentication;
    authenticating by the application server the secure token;
    receiving by the user device an enablement of the publish request from the medium server upon a successful authentication of the secure token by the application server; and
    publishing by the user device the video data to the media server.

2. The method of claim 1 wherein the step of authenticating the secure token comprises one of comparing, at the application server, the secure token received from the media server with the secure token transmitted with the endpoint to the user device; replicating, at the application server, the token generation process; and using cryptographic techniques at the application server.

3. The method of claim 2 further comprising:
proceeding to the step of enabling the user device to transmit packetized video data to the media server when the secure token received from the media server is authenticated.

4. The method of claim 2 further comprising:
denying permission for the user device to transmit packetized video data to the media server if the secure token received from the media server is not authenticated.

5. The method of claim 4 further comprising severing the connection between the user device and media server.

6. The method of claim 2 wherein the application server employs dynamic decisionmaking comprising the use of at least one external factor during authentication of the secure token.

7. The method of claim 6 wherein said external factor is selected from an IP address of the user device, a physical location of the user device, and a streaming rate of the user device.

8. The method of claim 1 further comprising a step of generating the secure token using a pseudo-random number generator or a hash-based encryption algorithm prior to the step of transmitting the endpoint and the secure token from the application server to the user device.

9. The method of claim 8 wherein the step of generating the secure token employs a different methodology than a previous secure token generation for the same user device.

10. The method of claim 1 wherein the step of transmitting an endpoint and a secure token from the application server to the user device is performed prior to the step of receiving, at an application server, a request from a user device to transmit packetized video data to a media server.

11. The method of claim 10 wherein the step of transmitting an endpoint and a secure token from the application server to the user device is performed in response to a user opening a streaming application on the user device.

12. The method of claim 11 wherein said media server and said application server are operated by a common entity.

13. A method of establishing a connection for transmission of packetized video data comprising:
receiving at an application server an endpoint request from a user device for the transmission of the packetized video data to a media server;
transmitting from the application server to the user device an endpoint and a secure token in response to the endpoint request;
receiving at the media server a publish request from the user device, said publish request including the secure token inserted into the playname field of said publish request;
authenticating, at the application server, the secure token; and
transmitting by the media server an enablement of the publish request, if the secure token is authenticated at the application server, to enable the user device to transmit the packetized video data to the media server.

14. The method of claim 13 further comprising initiating streaming from said user device to said media server.

15. The method of claim 14 wherein the step of authenticating the secure token further comprises comparing, at the application server, the secure token received from the media server with the secure token transmitted with the endpoint to the user device.

16. The method of claim 15 where a failure to authenticate the secure token results in a denial of the user device to transmit packetized video data to the media server and severing the connection between the user device and media server.

17. The method of claim 15 wherein the application server employs dynamic decisionmaking comprising the use of at least one external factor during authentication of the secure token.

18. The method of claim 14 wherein said step of initiating streaming comprises transmitting messages from the user device to the media server indicating metadata, audio data, and set chunk size.

19. The method of claim 13 further comprising, prior to the step of enabling the user device to transmit packetized video data to the media server, transmitting an enablement message from said application server to said media server and transmitting an enablement message from said media server to said user device.

20. The method of claim 13 further comprising, prior to the step of receiving at a media server a publish request from the user device, receiving at the media server a handshake initiation from the user device and establishing a connection between the media server and the user device.

21. A method of initiating transmission of a video stream at a user device comprising:
publishing an endpoint request to an application server device for the transmission of the video stream to a media server;
receiving an endpoint having an embedded secure token from said application server in response to the endpoint request;
transmitting from the user device a publish request to said media server, said publish request included said secure token received from said application server;
receiving from the medium server an enablement of said publish request, upon a successful authentication of said secure token by said application server device; and
publishing the video stream to said media server based on the received enablement of said publish request.

22. The method of claim 21 wherein said secure token is embedded in a playname field.

* * * * *